(12) United States Patent
Park et al.

(10) Patent No.: US 9,128,630 B2
(45) Date of Patent: Sep. 8, 2015

(54) SYSTEM AND METHOD FOR MONITORING MEMORY STACK SIZE

(71) Applicant: Hyundai Motor Company, Seoul (KR)

(72) Inventors: Ji Yong Park, Chungcheongnam-do (KR); Ui Jung Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 103 days.

(21) Appl. No.: 14/088,873

(22) Filed: Nov. 25, 2013

(65) Prior Publication Data

US 2014/0359246 A1 Dec. 4, 2014

(30) Foreign Application Priority Data

May 30, 2013 (KR) .................. 10-2013-0061449

(51) Int. Cl.
*G06F 12/02* (2006.01)
*G06F 3/06* (2006.01)

(52) U.S. Cl.
CPC ............ *G06F 3/0653* (2013.01); *G06F 3/0604* (2013.01); *G06F 3/0673* (2013.01)

(58) Field of Classification Search
CPC .... G06F 3/0653; G06F 3/0604; G06F 3/0673
See application file for complete search history.

(56) References Cited

U.S. PATENT DOCUMENTS

| 2004/0034742 | A1* | 2/2004 | Field et al. ................ 711/132 |
| 2008/0168460 | A1* | 7/2008 | Lee et al. ................. 718/104 |
| 2011/0252476 | A1* | 10/2011 | Loveland et al. ............. 726/24 |
| 2011/0321059 | A1* | 12/2011 | Yildiz et al. ............... 718/107 |
| 2013/0013965 | A1* | 1/2013 | Guillemin et al. ............ 714/48 |
| 2013/0124917 | A1* | 5/2013 | Das ........................ 714/6.12 |
| 2013/0246866 | A1* | 9/2013 | Costin et al. ............... 714/55 |
| 2013/0336105 | A1* | 12/2013 | Myrah et al. ............... 370/216 |

FOREIGN PATENT DOCUMENTS

| JP | 2000187601 A | 7/2000 |
| JP | 2003-323353 A | 11/2003 |
| JP | 2008003915 A | 1/2008 |
| JP | 2012093832 A | 5/2012 |
| KR | 10-2009-0018203 | 2/2009 |
| KR | 10-2011-0036243 A | 4/2011 |

* cited by examiner

*Primary Examiner* — Hiep Nguyen
(74) *Attorney, Agent, or Firm* — Mintz Levin Cohn Ferris Glovsky and Popeo, P.C.; Peter F. Corless

(57) ABSTRACT

A system and method for monitoring a memory stack size is provided, and more particularly, a method for monitoring a memory stack size, whereby the size of a memory stack applied to an operating system of a controller for a vehicle is monitored so that an overflow phenomenon of the memory stack can be prevented. That is, an accurate usage amount of a memory stack of the entire control system for a hybrid vehicle is efficiently and effectively monitored so that, when the control system reaches a risk level of stack overflow, fail-safe logic is executed and an overflow phenomenon of the memory stack as a result can be prevented.

14 Claims, 2 Drawing Sheets

SYSTEM AND METHOD FOR MONITORING MEMORY STACK SIZE

CROSS-REFERENCE TO RELATED PATENT APPLICATION

This application claims the benefit of Korean Patent Application No. 10-2013-0061449, filed on May 30, 2013 in the Korean Intellectual Property Office, the disclosure of which is incorporated herein in its entirety by reference.

BACKGROUND OF THE INVENTION

1. Field of the Invention

The present invention relates to a system and method for monitoring a memory stack size, and more particularly, to a system and method for monitoring a memory stack size, whereby the size of a memory stack applied to an operating system of a controller for a vehicle (e.g., a hybrid vehicle) is monitored so that an overflow phenomenon of the memory stack can be prevented.

2. Description of the Related Art

Embedded systems, in which microprocessors are embedded, refer to application systems that include hardware and software that perform a particular function. These embedded systems are being utilized in the field of electronic unit control, robot control, and process control of vehicles.

In particular, the driving force of hybrid vehicles are typically controller by a plurality of control systems, such as a motor controller for controlling a motor and an inverter, a hybrid control unit (HCU) for performing overall control on a variety of types of electronic units of a vehicle, and the like. Thus, a real time operating system (RTOS) of each controller must be configured without any problems so that the overall driving performance of a vehicle can be maintained.

In some control systems, a stack type memory stack has been used in the RTOS for operating a control system for a hybrid vehicle which is one of the most frequently used resources of an embedded system. As such when a particular task uses all portions of a stack given to the task, this task invades a memory region that is not given to the task to store its own information. This is called stack overflow.

As such, a larger capacity than the size of the memory stack to which a particular system is allocated is typically required even in the RTOS for operating the control system in hybrid vehicles. However, when an address out of a defined stack region is accessed, an overflow phenomenon of the memory stack occurs.

Overflow of the memory stack has a fatal effect on the control system for the hybrid vehicle in that it causes a target for a particular function to be reset. Due to the problem of the controller, serious problems may occur in overall control and performance of the vehicle as a result of this reset.

Generally, the usage region of the memory stack may be more excessively secured than a region that is actually being used so that the overflow phenomenon of the memory stack does not occur. However, since the usage region of the memory stack is uselessly and creates a surplus of memory, this is very inefficient and is very disadvantageous in terms of cost.

SUMMARY OF THE INVENTION

The present invention provides a system and method for monitoring a memory stack size, whereby an accurate usage amount of a memory stack of the entire control system for a vehicle (e.g., a hybrid vehicle) is efficiently and effectively monitored so that, when the control system reaches a risk level of stack overflow, fail-safe logic is entered and an overflow phenomenon of the memory stack can be easily prevented.

According to an aspect of the present invention, there is provided a system and method for monitoring a memory stack size. More specifically, the method initializes all stack regions of a memory stack and divides all stack regions of the memory stack into n blocks. Then a block sampling first section that is sampled among the stack regions of each block is checked using a first pointer and a second pointer for designating memory address positions, so as to determine whether the memory stack is used from a first block to an n-th block among the n blocks. When a usage trace is present in the block sampling first section from the first block to the last, n-th block, a determination is made as to whether a stack overflow phenomenon is able to occur and fail-safe logic is executed. If no usage trace is present in one among first through last, (n−1)-th blocks measuring, the size of the memory stack is then measured.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g., fuels derived from resources other than petroleum).

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
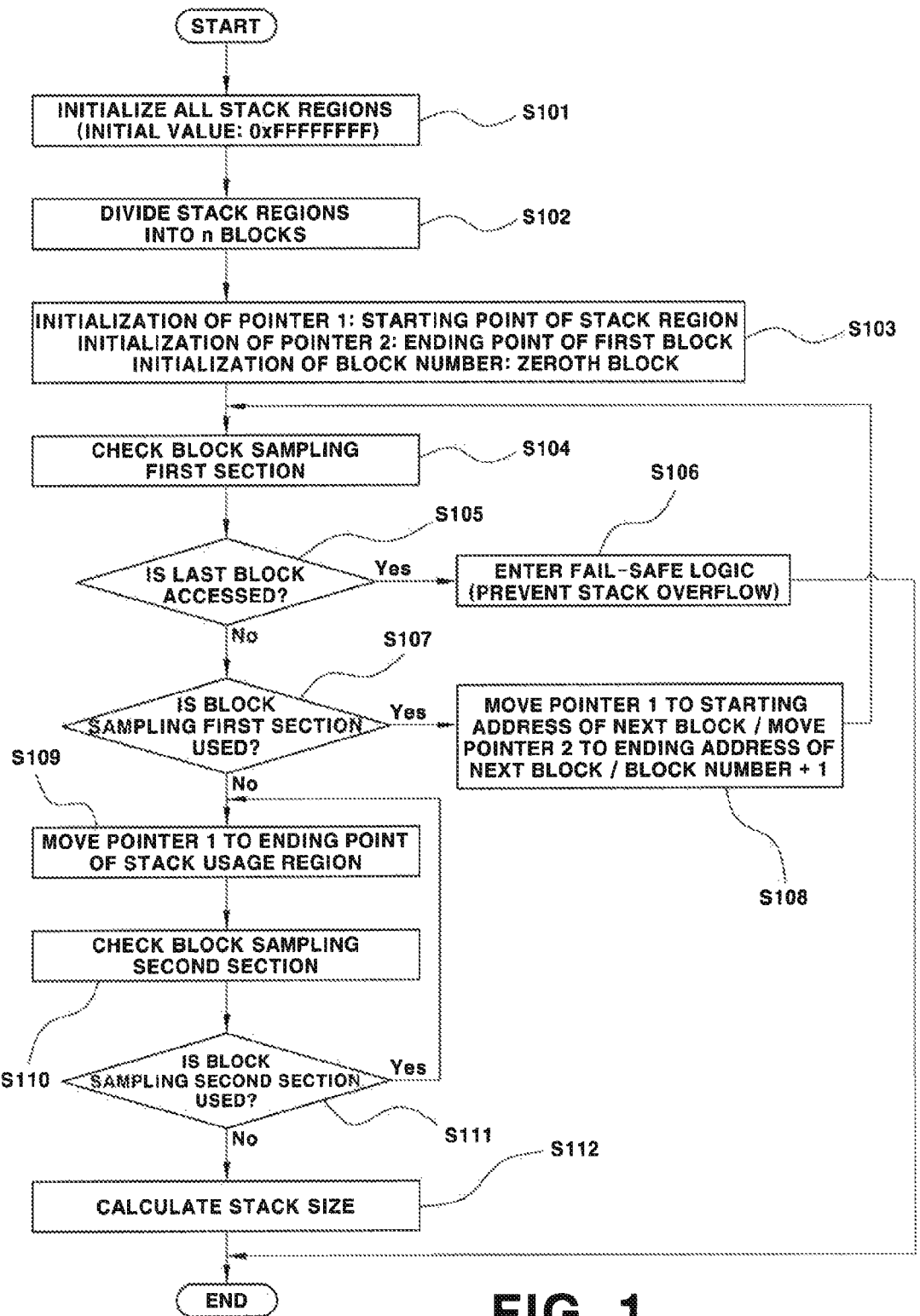
FIG. 1 is a flowchart illustrating a method for monitoring a memory stack size according to an exemplary embodiment of the present invention.
Figure 2:
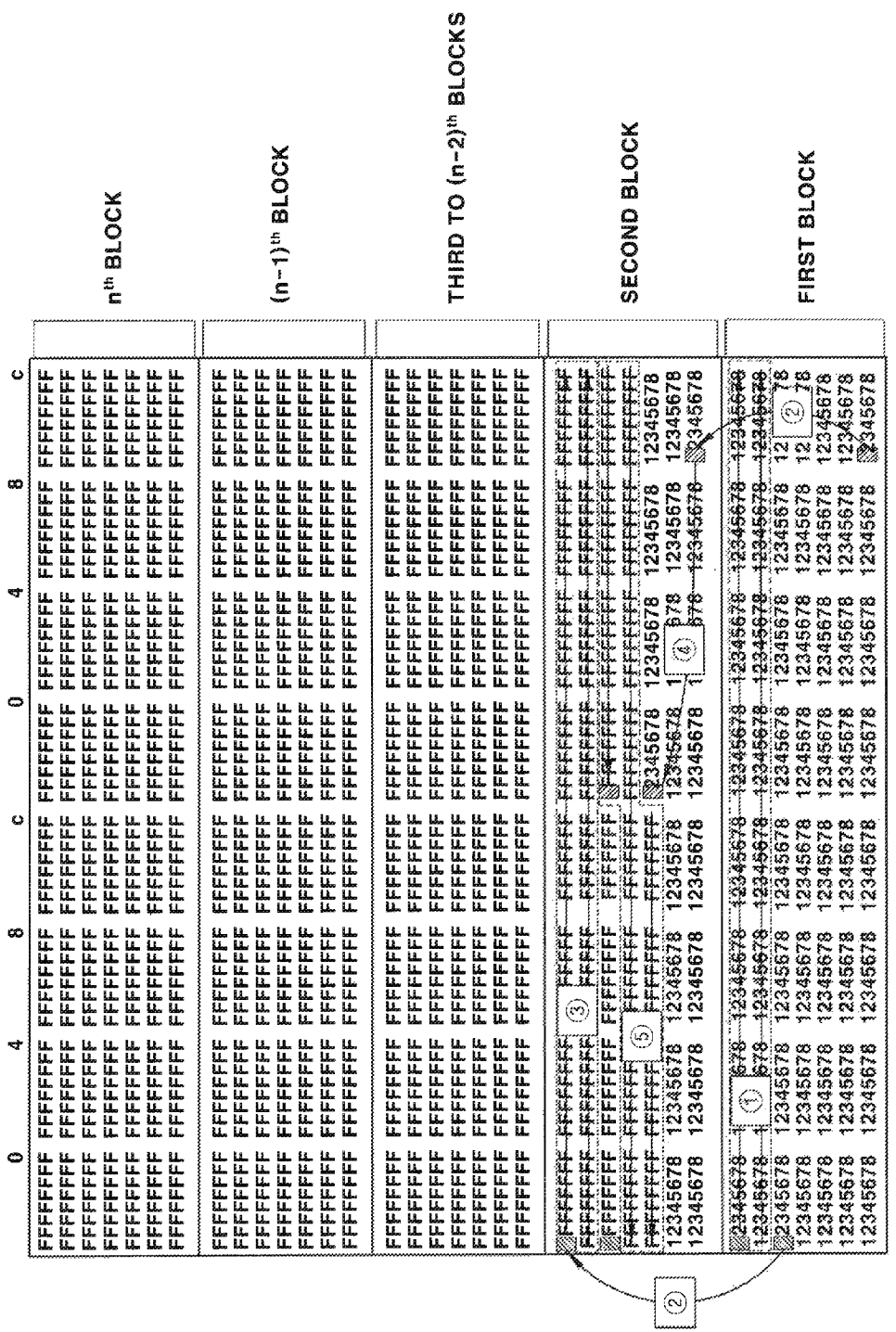
FIG. 2 illustrates measurement of a stack size by dividing a memory stack so as to perform the method for monitoring a memory stack size illustrated in FIG. 1, according to an exemplary embodiment of the present invention.

FIG. 1 is a flowchart illustrating a method for monitoring a memory stack size according to an exemplary embodiment of the present invention, and FIG. 2 illustrates measurement of a stack size by dividing a memory stack so as to perform the method for monitoring a memory stack size illustrated in FIG. 1, according to an exemplary embodiment of the present invention.

First, in the method described in FIG. 1, all stack regions (memory space) of the memory stack are initialized (S101). For example, all stack regions of the memory stack are initialized once, wherein an initial value of each stack region is set to 0xFFFFFFFF (F: hexadecimal number).

In this case, the reason why all stack regions of the memory stack are initialized is to clearly differentiate the stack regions after the initialization operation is performed between a usage section (storage region) and a non-usage section (non-storage region) so that a series of stack size monitoring operations that will be describe later can be accurately performed.

In addition, all stack regions of the memory stack may be divided into n blocks (S102). The reason why all stack regions of the memory stack are divided into n blocks is to sequentially perform the stack size monitoring operations in units of block so that stack size monitoring can be efficiently and effectively performed. As such, when all stack regions of the memory stack are divided into n blocks and are initialized, the size (e.g., unstored, remaining memory space) of the memory stack is measured by the system. Preferably, an additional measurement module may be connected to a regular code of the memory stack so that a stack size per task in which the memory stack is used, can be measured.

Here, an embodiment in which the size of the memory stack is measured, will now be described in more detail with reference to FIGS. 1 and 2.

More specifically, a block sampling first section may be a section that is defined to check whether data of a block are used, and a block sampling second section may be a section that is used to secure the position of an end of the stack region being used and to check an existence position of last data.

Furthermore, a first pointer serves to check a usage trace regarding whether the block sampling first section is used, and a second pointer serves to check a usage trace regarding whether the block sampling second section is used.

In order to measure the size of the memory stack, not all of n blocks are checked but only the block sampling first section that is sampled among stack regions of each block that is checked (S104). More specifically, a checking operation that determines whether the stack region is used, for measurement of the size of the memory stack, is sequentially performed from a first block among n blocks, and not all portions of the first block are checked but the block sampling first section (i.e., a predetermined storage region that is arranged in a reverse direction from a starting point of the stack region) that is sampled among stack regions of the first block is first checked instead.

To this end, the first pointer and the second pointer designating memory address positions are initialized, and as illustrated in FIG. 2, the first pointer is designated at a starting point (e.g., starting address) of the stack regions of the first block among n blocks, and the second pointer is designated at an ending point (e.g., ending address) of the stack regions of the first block (S103). Subsequently, the block sampling first section that is sampled among the stack regions of the first block is checked using first pointer designated at the starting point (e.g., starting address) of the stack regions of the first block.

In more detail, the first pointer accesses one of first through last blocks, i.e., (n−1)-th blocks and determines whether a usage trace is present in the block sampling first section (S017), and when the system determines that the usage trace is present, the first pointer and the second pointer are designated to the next block (S108).

For example, as indicated by 1 of FIG. 2, when first pointer accesses the block sampling first section of the stack regions of the first block and the system determines that a usage trace (e.g., memory record) is present in the block sampling first section, the first pointer is moved to and is designated at a starting point of stack regions of a second block, and the second pointer is designated at an ending point of the stack regions of the second block, as indicated by 22 of FIG. 2, this uses characteristics in which data are successively stacked from a high address to a low address of the stack.

When it is determined that the first pointer accesses the first block though a last, n-th block (S105) and a usage trace is present in the block sampling first section of stack regions of the last, n-th block, the system then determines that a stack overflow phenomenon may occur and fail-safe logic is executed as a result (S106).

More specifically, if fail-safe logic is executed, a flag signal identifying that all blocks of the memory stack are being used, is transmitted to a central processing unit (CPU) and simultaneously the CPU performs control for turning on a warning light that is present in a cluster of a vehicle so that a driver can be easily notified that an overflow phenomenon of the memory stack may occur.

Also, if fail-safe logic is executed, the CPU executes a limited task so that only a minimum function of driving the vehicle can be performed so that the driver can drive the vehicle a to a garage.

That is, since the overflow phenomenon of the memory stack that is perceived by the driver, has a fatal effect on a controller, resets a target for a particular function and may cause serious problems on the overall control and performance of a hybrid vehicle due to the problem of the controller, the controller can be serviced in the garage as required.

In contrast, when fail-safe logic is not executed, an operation of measuring the size of the memory stack is performed. That is, first pointer accesses one among first through last, $(n-1)^{th}$ blocks and determines whether a usage trace is present in the block sampling first section (S107), if it is determined that no usage trace is present, the operation of measuring the size of the memory stack is successively performed.

For example, if it is determined that the usage trace is present in the block sampling first section of the first block, the first pointer is moved to and is designated at a starting point of stack regions of a second block, and the second pointer is designated at an ending point of the stack regions of the second block, as indicated by 2 of FIG. 2. In this way, if a block that does not use all portions of the block sampling first section among the first through n-th blocks is first detected, it is estimated that last data exist in the block, and the first pointer is moved in a reverse direction (S109).

For example, as indicated by 3 of FIG. 2, the first pointer is moved in the reverse direction and checks the block sampling first section of the stack regions of the second block. In this way, it is checked whether a usage trace is present in a block sampling second section (predetermined storage region arranged in a forward direction from an ending point of the stack region), using the second pointer (S110).

As a further example, as indicated by 4 of FIG. 2, it is checked whether the block sampling second section of the block, i.e., the second block is used, using second pointer (S111), and when the existence position of last data (initial value: 0xFFFFFFFF) is detected, the system determines that last data exist in the block sampling second section of the second block. In this way, when it is determined that last data exist in one among first through last, (n−1)-th blocks of the stack regions of the memory stack, a final stack size calculation operation is performed (S112).

In a final stack size calculation, the second pointer is moved to the position of the last data and then, as indicated by 55 of FIG. 2, the second pointer is moved from the position of the last data in the forward direction, and the system determines whether a data usage trace is present in the block sampling second section.

For example, as indicated by 3 of FIG. 2, the first pointer is moved in the reverse direction, performs checking on the block sampling first section of the stack regions of the second block so as to determine whether a data usage trace is present, and simultaneously, as indicated by 5 of FIG. 2, the second pointer is moved from the position of the last data in the forward direction and determines whether a data usage trace is present in the block sampling second section.

Thus, if operation 5 of FIG. 2 is finished, the second pointer is disposed at a position where the size of the block sampling second section is added to an end of an actually-used data region. In this case, the block sampling second section of the stack regions of the second block is subtracted from a value that is obtained by subtracting an ending address of the stack entire region, i.e., an ending address (e.g., an ending address of an n-th block from a third block) of the stack entire region in which no usage trace is detected, from the address of the second pointer, thus determining the size of the stack size that is being currently used.

Advantageously, the possibility of overflow can be monitored by calculating only the stack size that is being currently used, and a data non-usage region (e.g., a data non-usage region from the third block to the n-th block of the memory stack) can also be calculated by subtracting the using stack size from the entire stack size.

Accordingly, the purpose of stack size calculation is to leave a stack usage amount and a failure code on record when fail-safe logic is executed due to overflow that occurs while overflow monitoring is performed, so that the driver can easily determine a cause of failure at the garage.

As described above, when fail-safe logic is not executed so as to prevent stack overflow, when the stack size is monitored later, only the final stack size calculation operation (S112) is performed without undergoing operations S101 through S111 so that the stack size can be detected. As such, a periodic check for stack size monitoring can be performed and the time required for monitoring can be remarkably reduced.

As described above, the present invention provides the following effects.

According to the present invention, an accurate usage amount of a memory stack of the entire control system for a vehicle is efficiently and effectively monitored so that, when fail-safe logic is executed due to overflow, the usage amount of the memory stack and a failure code are left on record so that the cause of failure can be easily identified at a garage.

In particular, when an overflow phenomenon of a memory stack occurs and fail-safe logic is executed, a limited task is performed, and only a minimum function for driving a vehicle is performed so that a driver is able to drive the vehicle to the garage and a controller of the control system can be serviced based on the usage amount of the memory stack and the failure code when overflow occurs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for monitoring a memory stack size, the method comprising:
   initializing, by a controller, all stack regions of a memory stack;
   dividing, by the controller, all the stack regions of the memory stack into n blocks;
   checking, by the controller, a block sampling first section that is sampled among the stack regions of each block, using a first pointer and a second pointer that each designate memory address positions in order to determine whether the memory stack is used from a first block to an n-th block among the n blocks;
   determining, by the controller, whether a usage trace is present in the block sampling section;
   in response to determining that a usage trace is present in the block sampling first section from the first block to the last, n-th block, determining, by the controller, that a stack overflow phenomenon is able to occur and if so, executing fail-safe logic; and
   in response to determining that no usage trace is present in one among first through last, (n−1)-th blocks, measuring a size of the memory stack.

2. The method of claim 1, wherein when the initializing of the all stack regions is performed, an initial value of each stack region is set to 0xFFFFFFFF where F is a hexadecimal number.

3. The method of claim 1, wherein in order to measure the size of the memory stack, an additional measurement module is connected to a regular code of the memory stack so that stack size measurement per task in which the memory stack is used, is able to be performed.

4. The method of claim 1, wherein in order to check a block sampling first section of each block, after the first pointer and the second pointer designating memory address positions are initialized, the first pointer is designated at a starting point of stack regions of a first block among n blocks, and the second pointer is designated at an ending point of the stack regions of the first block.

5. The method of claim 1, wherein, if one among first through (n−1)-th blocks is accessed and a usage trace is present in the block sampling first section, the first pointer and the second pointer are designated at a starting point and an ending point of a next block.

6. The method of claim 1, wherein when fail-safe logic is executed, a flag signal identifying that all blocks of the memory stack are being used, is transmitted to a central processing unit (CPU) and simultaneously the CPU performs control that turns on a warning light that is present in a cluster of a vehicle and executes a limited task.

7. The method of claim 1, wherein the measuring of the size of the memory stack comprises:
    detecting a particular block in which the block sampling first section is not used, of first through n-th blocks;
    moving the first pointer in a reverse direction and detecting a data usage trace in the block sampling first section of the particular block;
    detecting an existence position of last data by checking a data usage trace in a block sampling second section of the particular block using the second pointer; and
    when the second pointer is disposed at a position where a size of the block sampling second section is added to an end of an actually-used data region, subtracting the block sampling second section from a value that is obtained by subtracting an ending address of the entire stack region from an address of second pointer to determine a size of the stack size that is being currently used.

8. A non-transitory computer readable medium containing program instructions executed by a controller for monitoring a memory stack size, the computer readable medium comprising:
    program instructions that initialize all stack regions of a memory stack;
    program instructions that divide all the stack regions of the memory stack into n blocks;
    program instructions that check a block sampling first section that is sampled among the stack regions of each block, using a first pointer and a second pointer that each designate memory address positions in order to determine whether the memory stack is used from a first block to an n-th block among the n blocks;
    program instructions that determine whether a usage trace is present in the block sampling section;
    program instructions that determine that a stack overflow phenomenon is able to occur and if so, executing fail-safe logic in response determining that a usage trace is present in the block sampling first section from the first block to the last, n-th block; and
    program instructions that measure a size of the memory stack in response to determining that no usage trace is present in one among first through last, (n−1)-th blocks.

9. The non-transitory computer readable medium of claim 8, wherein when the initializing of the all stack regions is performed, an initial value of each stack region is set to 0xFFFFFFFF where F is a hexadecimal number.

10. The non-transitory computer readable medium of claim 8, wherein in order to check a block sampling first section of each block, after the first pointer and the second pointer designating memory address positions are initialized, the first pointer is designated at a starting point of stack regions of a first block among n blocks, and the second pointer is designated at an ending point of the stack regions of the first block.

11. The non-transitory computer readable medium of claim 8, wherein, if one among first through (n−1)-th blocks is accessed and a usage trace is present in the block sampling first section, the first pointer and the second pointer are designated at a starting point and an ending point of a next block.

12. The non-transitory computer readable medium of claim 8, wherein when fail-safe logic is executed, a flag signal identifying that all blocks of the memory stack are being used, is transmitted to a central processing unit (CPU) and simultaneously the CPU performs control that turns on a warning light that is present in a cluster of a vehicle and executes a limited task.

13. The non-transitory computer readable medium of claim 8, wherein the program instructions that measure of the size of the memory stack include:
    program instructions that detect a particular block in which the block sampling first section is not used, of first through n-th blocks;
    program instructions that move the first pointer in a reverse direction and detecting a data usage trace in the block sampling first section of the particular block;
    program instructions that detect an existence position of last data by checking a data usage trace in a block sampling second section of the particular block using the second pointer; and
    program instructions that subtract the block sampling second section from a value that is obtained by subtracting an ending address of the entire stack region from an address of second pointer to determine a size of the stack size that is being currently used when the second pointer is disposed at a position where a size of the block sampling second section is added to an end of an actually-used data region.

14. A controller for monitoring a memory stack size in a vehicle, the controller comprising:
    a memory configured to store a plurality of program instructions; and
    a processor configured to execute the plurality of program instructions, the program instructions operable to:
    initialize all stack regions of a memory stack;
    divide all the stack regions of the memory stack into n blocks;
    check a block sampling first section that is sampled among the stack regions of each block, using a first pointer and a second pointer that each designate memory address positions in order to determine whether the memory stack is used from a first block to an n-th block among the n blocks;
    determine whether a usage trace is present in the block sampling section;
    determine that a stack overflow phenomenon is able to occur and if so, executing fail-safe logic in response determining that a usage trace is present in the block sampling first section from the first block to the last, n-th block; and
    measure a size of the memory stack in response to determining that no usage trace is present in one among first through last, (n−1)-th blocks.

* * * * *